(12) United States Patent
Bigos et al.

(10) Patent No.: US 12,141,910 B2
(45) Date of Patent: Nov. 12, 2024

(54) IMAGE RENDERING METHOD AND APPARATUS

(71) Applicant: Sony Interactive Entertainment Inc., Tokyo (JP)

(72) Inventors: Andrew James Bigos, Staines (GB); Gilles Christian Rainer, London (GB); Cristian Craciun, Wallington (GB)

(73) Assignee: Sony Interactive Entertainment Inc., Tokyo (JP)

(*) Notice: Subject to any disclaimer, the term of this patent is extended or adjusted under 35 U.S.C. 154(b) by 95 days.

(21) Appl. No.: 17/699,394

(22) Filed: Mar. 21, 2022

(65) Prior Publication Data

US 2022/0309736 A1    Sep. 29, 2022

(30) Foreign Application Priority Data

Mar. 24, 2021   (GB) ...................................... 2104110

(51) Int. Cl.
| | |
|---|---|
| *G06T 15/06* | (2011.01) |
| *G06T 1/20* | (2006.01) |
| *G06T 15/20* | (2011.01) |
| *G06T 15/40* | (2011.01) |
| *G06T 15/50* | (2011.01) |

(52) U.S. Cl.
CPC ................ *G06T 15/06* (2013.01); *G06T 1/20* (2013.01); *G06T 15/20* (2013.01); *G06T 15/40* (2013.01); *G06T 15/506* (2013.01)

(58) Field of Classification Search
None
See application file for complete search history.

(56) References Cited

U.S. PATENT DOCUMENTS

| | | |
|---|---|---|
| 10,430,978 B2 | 10/2019 | Yumer |
| 11,436,793 B1 | 9/2022 | Schied |
| 11,637,998 B1 | 4/2023 | Pieper |
| 2012/0327086 A1 | 12/2012 | Shimbaru |
| 2013/0335434 A1 | 12/2013 | Wang |
| 2014/0274391 A1 | 9/2014 | Stafford |
| 2016/0162402 A1 | 6/2016 | Woolley, Jr. |
| 2018/0069932 A1 | 3/2018 | Tiwari |
| 2018/0102858 A1 | 4/2018 | Tiwari |
| 2018/0114096 A1 | 4/2018 | Sen |

(Continued)

FOREIGN PATENT DOCUMENTS

| | | |
|---|---|---|
| CN | 109509248 A | 3/2019 |
| CN | 111833430 A | 10/2020 |

(Continued)

OTHER PUBLICATIONS

Extended European Search report for related EP Application No. 22162809.2, 11 pages, dated Sep. 22, 2022.

(Continued)

*Primary Examiner* — Nurun Flora
(74) *Attorney, Agent, or Firm* — Matthew B. Dernier, Esq.

(57) ABSTRACT

A method of generating a training set for a neural precomputed light model includes: generating a plurality of candidate viewpoints of a scene, culling candidate viewpoints according to a probability that depends upon a response of the surface of the scene to light at a surface position in the scene corresponding to the viewpoint, and generating training images at the remaining viewpoints.

16 Claims, 10 Drawing Sheets

(56) References Cited

U.S. PATENT DOCUMENTS

| | | |
|---|---|---|
| 2018/0348860 A1 | 12/2018 | Lin |
| 2020/0107423 A1 | 4/2020 | Harrison |
| 2020/0143230 A1 | 5/2020 | Su |
| 2020/0211157 A1 | 7/2020 | Pohl |
| 2020/0211272 A1 | 7/2020 | Barczak |
| 2020/0273231 A1 | 8/2020 | Schied |
| 2020/0302684 A1 | 11/2020 | Rhemann |
| 2020/0372284 A1 | 11/2020 | Rhemann |
| 2021/0065440 A1 | 3/2021 | Sunkavalli |
| 2021/0133473 A1 | 5/2021 | Oosake |
| 2021/0294945 A1* | 9/2021 | Müller .................. G06T 15/506 |
| 2021/0295592 A1 | 9/2021 | von Cramon |
| 2022/0301257 A1 | 9/2022 | Garbin |
| 2022/0309736 A1 | 9/2022 | Bigos |
| 2022/0405682 A1* | 12/2022 | Yoon ........................ G06N 3/04 |

FOREIGN PATENT DOCUMENTS

| | | |
|---|---|---|
| CN | 112509109 A | 3/2021 |
| EP | 2261862 A1 | 12/2010 |
| EP | 3675045 A1 | 7/2020 |
| EP | 3789964 A1 | 3/2021 |
| GB | 2563115 A | 12/2018 |
| WO | 2018158347 A1 | 9/2018 |

OTHER PUBLICATIONS

Zhang Chen et al., "A Neural Rendering Framework for Free-Viewpoint Relighting", IEEE/CVF Conference on Computer Vision and Pattern Recognition, pp. 5598-5609, Jun. 13, 2020.
Extended European Search report for related EP Application No. 22162501.5, 17 pages, dated Sep. 22, 2022.
Extended European Search report for related EP Application No. 22161342.5, 10 pages, dated Aug. 31, 2022.
Pratul P. Srinivasan et al., "NeRV: Neural Reflectance and Visibility Fields for Relighting and View Synthesis", arxiv.org, Cornell University Library, pp. 1-12, Dec. 7, 2020.
Giulio Jiang et al., "One Shot Radiance: Global Illumination Using Convolutional Autoencoders", arxiv.org, Cornell University Library, pp. 1-11, Oct. 6, 2019.
Currius R Ret al., "Spherical Gaussian Light-field Textures for Fast Precomputed Global Illumination", Computer Graphics Forum : Journal of the European Association for Computer Graphics, Wiley-Blackwell, Oxford, vol. 39, No. 2, pp. 133-146, Jul. 13, 2020.
Peiran Ren et al., "Global illumination with radiance regression functions", ACM Transactions on Graphics, vol. 32, No. 4, pp. 130:2-130:12, Jul. 1, 2013.
Extended European Search report for related EP Application No. 22161560.2, 15 pages, dated Aug. 31, 2022.
Terrance Devries et al., "Learning Confidence for Out-of-Distribution Detection in Neural Networks", arxiv.org, Cornell University Library, 12 pages, Feb. 13, 2018.
Extended European Search report for corresponding EP Application No. 22161587.5, 21 pages, dated Aug. 31, 2022.
Angelos Katharopoulos et al., "Not All Samples Are Created Equal: Deep Learning with Importance Sampling", arxiv.org, Cornell University Library, 13 pages, Mar. 2, 2018.
Settles Burr, "Active Learning Literature Survey" URL:http://axon.cs.byu.edu/-martinez/classes/778/Papers/settles.activelearning.pdfc, 46 pages, Jan. 9, 2009.
Paul Sujoy et al., "Efficient selection of informative and diverse training samples with applications in scene classification", 2016 IEEE International Conference on Image Processing (ICIP) pp. 494-498, Sep. 25, 2016.

Zhang Cha et al., "Active Scene Capturing for Image-Based Rendering with a Light Field Setup", Electrical and Computer Engineering, URL:http://chenlab.ece.cornell.edu/Publication/Cha/tr03_02.pdf, pp. 1-16, Jan. 1, 2003.
Chloe Legendre et al., "DeepLight: Learning Illumination for Unconstrained Mobile Mixed Reality", 2019 IEEE/CVF Conference on Computer Vision and Pattern Recognition (CVPR), 11 pages, Jun. 1, 2019.
Zhe Chen et al., "Invertible Neural BRDF for Object Inverse Rendering", arxiv.org, pp. 1-9, Aug. 11, 2020.
Song Shuran et al., "Neural Illumination: Lighting Prediction for Indoor Environments", URL:https://openaccess.thecvf.com/content_CVPR_2019/papersSong_Neural_Illumination_Lighting_Prediction_for_Indoor_Environments_CVPR_2019_paper.pdf>, pp. 6918-6926, Jan. 1, 2019.
Ayush Tewari et al., "State of the Art on Neural Rendering", arxiv.org, Cornell University Library, vol. 39, No. 2, 27 pages, Apr. 8, 2020.
Extended European Search report for related EP Application No. 22166963.3, 9 pages, dated Sep. 2, 2022.
Search report for corresponding GB Application No. GB2104109, 4 pages, dated Sep. 21, 2021.
Search report for corresponding GB Application No. GB2104113.2, 4 pages, dated Sep. 23, 2021.
Combined Search and Examination report for corresponding GB Application No. GB2104111.6, 8 pages, dated Sep. 24, 2021.
Search report for corresponding GB Application No. GB2104114.0, 4 pages, dated Sep. 21, 2021.
Combined Search and Examination report for corresponding GB Application No. GB2104106.6, 8 pages, dated Sep. 24, 2021.
Search report for corresponding GB Application No. GB2104156.1, 4 pages, dated Sep. 24, 2021.
Combined Search and Examination Report for corresponding GB Application No. GB2104152, 7 pages, dated Sep. 21, 2021.
Extended European Search report for related EP Application No. 22161352.4, 11 pages, dated Oct. 28, 2022.
Theis Justus, et al., "Deferred neural rendering: Image Syntheses using Neural Textures" ACM Transactions on Graphics, NY, US, vol. 38, No. 4, 12 pages, Jul. 12, 2019.
Giulio Jiang, et al., "Deep Radiance Caching: Convolutional Autoencoders Deeper in Ray Tracing" Computers & Graphics, Imperial College London, 11 pages, Jul. 30, 2020.
Giuseppe Claudio Guarnera, et al., "BxDF material acquisition, representation, and rendering for VR and design" 21 pages, Nov. 17, 2019.
Search report for corresponding GB Application No. GB2104110.8, 4 pages, dated Sep. 1, 2021.
Michelle Guo, et al., "Object-Centric Neural Scene Rendering", arxiv.org, arXiv:2012.08503, pp. 1-10, Dec. 15, 2020.
Chiyu Jiang, et al., "ShapeFlow: Learnable Deformation Flows Among 3D Shapes", NIPS'20: Proceedings of the 34th International Conference on Neural Information Processing Systems, pp. 1-13, Dec. 6, 2020.
Chiyu Jiang, et al., "ShapeFlow: Supplementary Material", NIPS'20: Proceedings of the 34th International Conference on Neural Information Processing Systems, pp. 14-16, Dec. 6, 2020.
Ajay Shrestha, et al., "Review of Deep Learning Algorithms and Architectures", IEEE, IEEE Access, vol. 7, pp. 53040-53065, May 1, 2019.
Ben Mildenhall, et al. "NeRF: Representing Scenes as Neural Radiance Fields for View Synthesis." arXiv: arXiv:2003.08934, 25 pages, dated Aug. 3, 2020.
Gardner Marc-Andre., et al., "Learning to Predict indoor illumination from a single image," ariv preprint aeXiv: 1704.00090, 14 pages, Apr. 1, 2017.

* cited by examiner

IMAGE RENDERING METHOD AND APPARATUS

BACKGROUND OF THE INVENTION

Field of the Invention

The present invention relates to an image rendering method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ray tracing is a rendering process in which paths of light are traced within a virtual scene. The interactions of each ray with objects or surfaces within the scene are then simulated. To achieve a degree of realism, typically this simulation takes account of material properties of these objects or surfaces, such as their colour and reflectivity.

As a result, ray tracing is a computationally expensive process. Furthermore, that cost varies from image frame to image frame, depending on what scene is being illuminated, by what lights, and from what viewpoint.

This makes maintaining a preferred frame rate for rendering such images difficult to achieve; for an average computational cost corresponding to an average image completion time (i.e. a frame rate), and a given variance around that average caused by ray tracing, then either the average image quality has to be set low enough that the variance only rarely impacts the frame rate, or if the average image quality is set close to a maximum for the preferred frame rate, then the consistency of that frame rate must be sacrificed when varying ray tracing demands fluctuate above the average.

Neither outcome is desirable, but cannot easily be avoided whilst the computational burden of the ray tracing process is data-driven and unpredictable.

The present invention seeks to address or mitigate this problem.

SUMMARY OF THE INVENTION

Various aspects and features of the present invention are defined in the appended claims and within the text of the accompanying description and include at least:
  in a first instance, a method of generating a training set for a neural precomputed light model in accordance with claim 1;
  in another instance, an image rendering method for rendering a pixel at a viewpoint in accordance with claim 12;
  in another instance, a system for generating a training set for a neural precomputed light model in accordance with claim 14;
  in another instance, a system for rendering a pixel at a viewpoint in accordance with claim 15.
It is to be understood that both the foregoing general summary of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
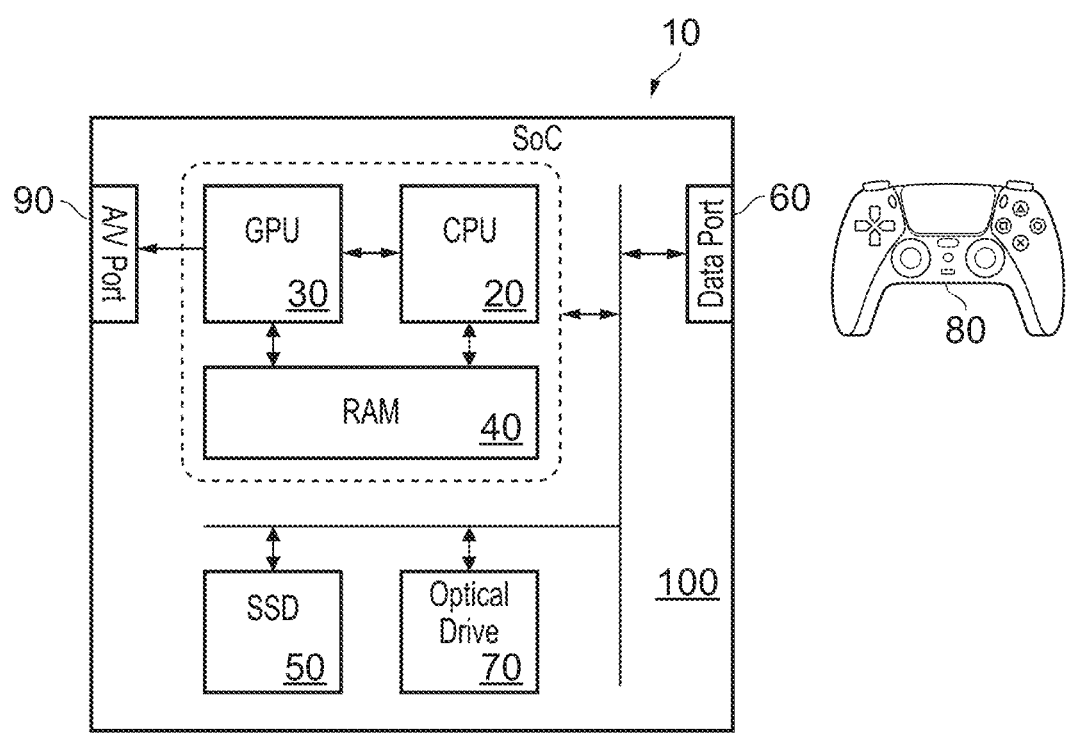
FIG. 1 is a schematic diagram of an entertainment device in accordance with embodiments of the present description.

An image rendering method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present description seek to address or mitigate the above problem by using a machine learning system that learns the relationship between pixel surface properties and rendered pixels for a given object or scene; by using such a machine learning system, it is then possible to approximate a ray traced render of the object or scene based on a relatively consistent computational budget (that of running the machine learning system).

Different machine learning systems can be trained for different scenes, locations or parts thereof, or for different objects or materials for use within one or more scenes, as explained later herein.

The machine learning systems are comparatively small (typically in the order of 100 KB to 1 MB) and so for the purposes of being run by a GPU (30), may be pulled into memory and subsequently discarded like a texture of the scene. The systems can be run by shaders of the GPU. It will also be appreciated that in principle the machine learning systems could alternatively or in addition by run by a CPU

(20) or by a general or specialist co-processor, such as a neural network processor or an ASIC.

Referring now to the drawings, wherein like reference numerals designate identical or corresponding parts throughout the several views, FIGS. 2-7 illustrate the problem space within which the machine learning system is trained.

Figure 2:
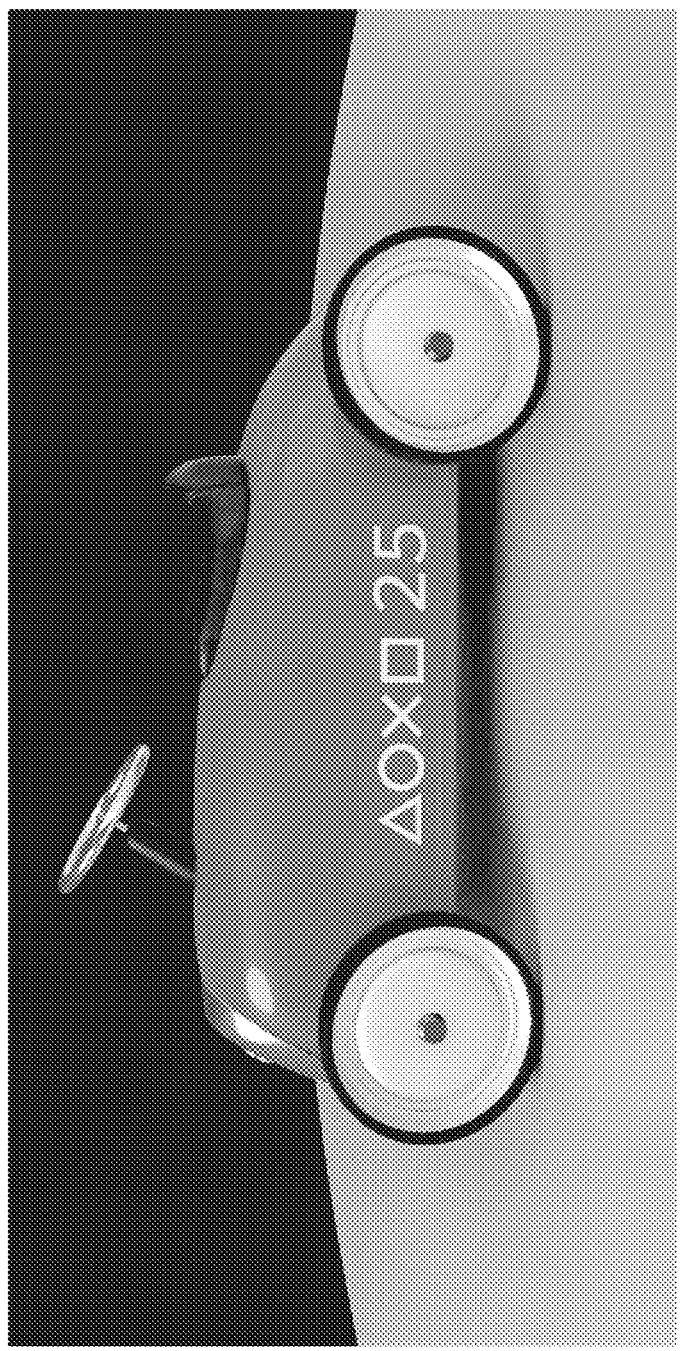
FIG. 2 is an illustration of a ray-traced object in accordance with embodiments of the present description.

FIG. 2 is a high-quality ray-traced render 200 of an example object or scene, in this case a car on a dais.

Figure 3:
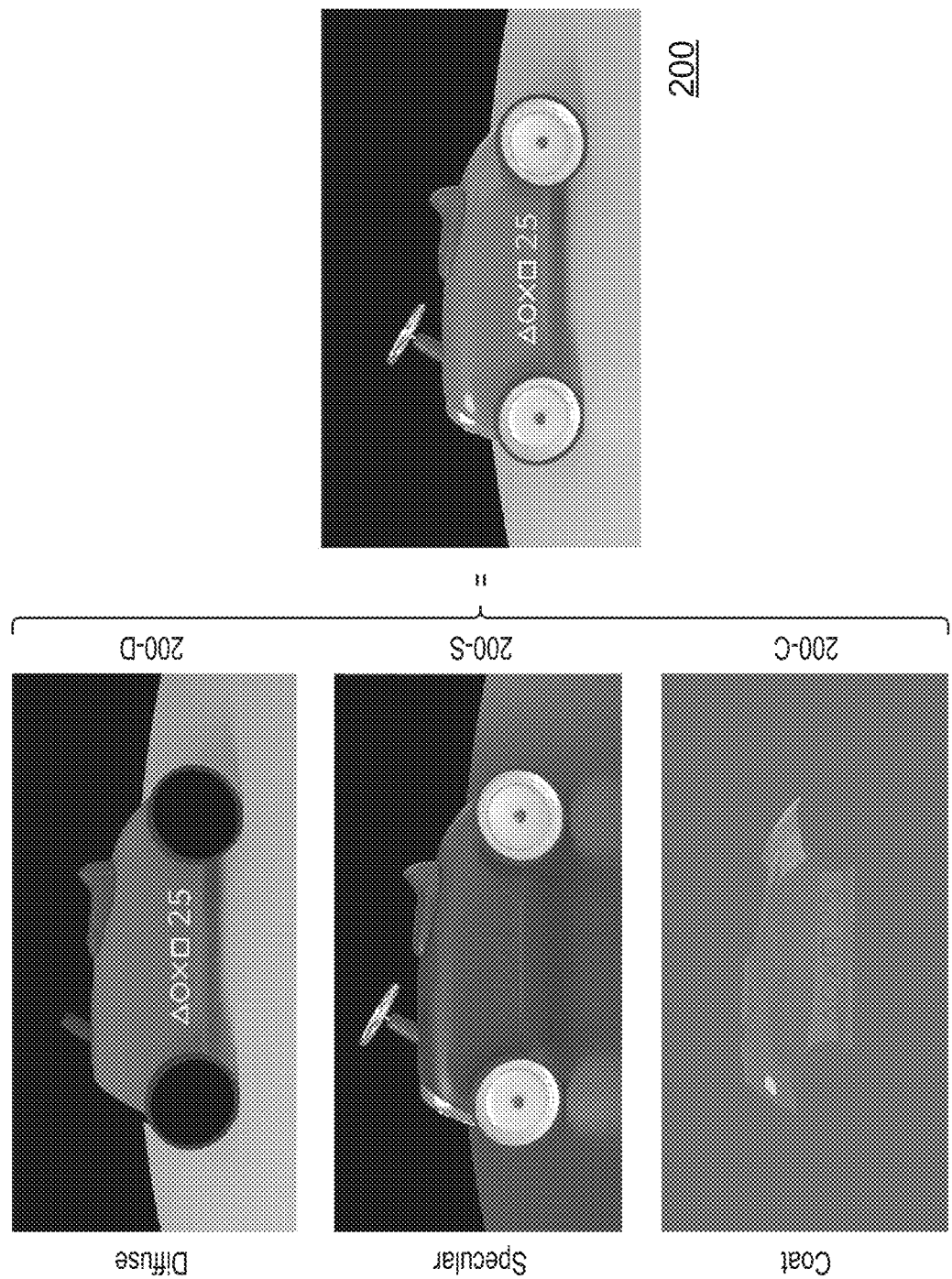
FIG. 3 is a schematic diagram of components contributing to the ray-traced object in accordance with embodiments of the present description.

FIG. 3 illustrates the different contributing components behind this render. Firstly, a diffuse lighting component 200-D typically captures the matt colours of the surface and the shading caused by the interaction of light and shape, whilst secondly a specular lighting component 200-S captures the reflectivity of the surface, resulting in glints and highlights. Optionally one or more additional components can be included, such as a sheen or 'coat' 200-C, which is a second outer surface that may comprise additional gloss or patterning. Variants of such a coat may allow for partial transparency and/or partial diffusion in a manner similar to skin or fabric, for example. Each of these components can be conventionally generated using a respective ray tracing process.

These components sum additively to form the overall image previously seen in FIG. 2. It will be appreciated that whilst typically 2 or 3 such components will contribute to a render, in come circumstances there may be fewer (for example if just a diffuse component is desired) or more (for example when the object is also translucent and so requires a transmissive component).

Figure 4:
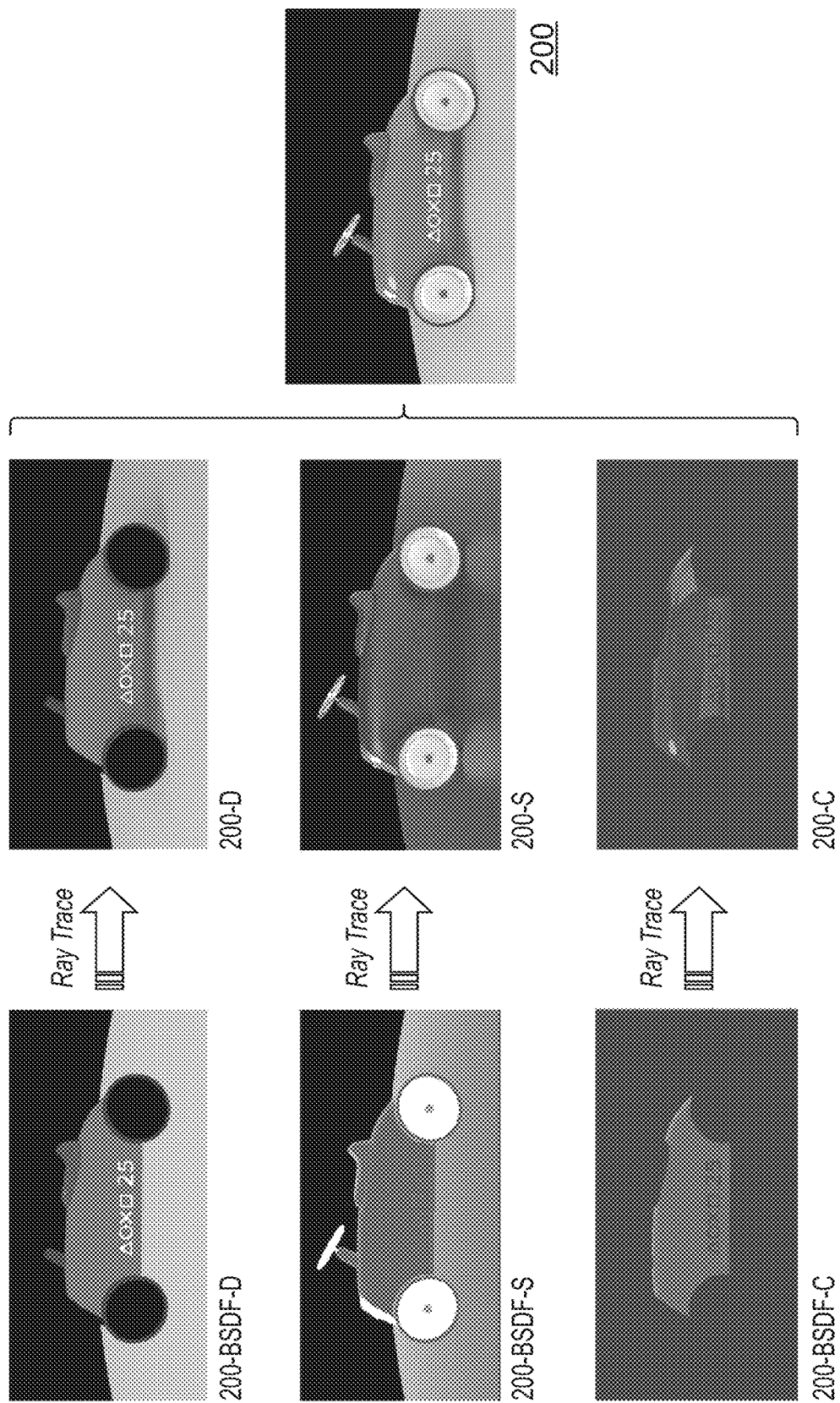
FIG. 4 is a schematic diagram of distribution functions associated with respective components in accordance with embodiments of the present description.

FIG. 4 next includes the material properties of the object that give rise to the above contributing components of the image.

The material property is expressed as a so-called bidirectional scattering distribution function (BSDF) or bidirectional reflectance distribution function (BRDF).

A BRDF defines how light is reflected at an opaque surface, whilst similarly a BSDF defines the probability that a ray of light will be reflected or scattered in a particular direction. Hence a BRDF or BSDF is a function that describes the lighting properties of a surface (excluding the incoming/outgoing radiance itself). Other functions may also be used as appropriate, such as a bidirectional transmittance distribution function (BTDF), defining how light passes through a material.

Figure 5:
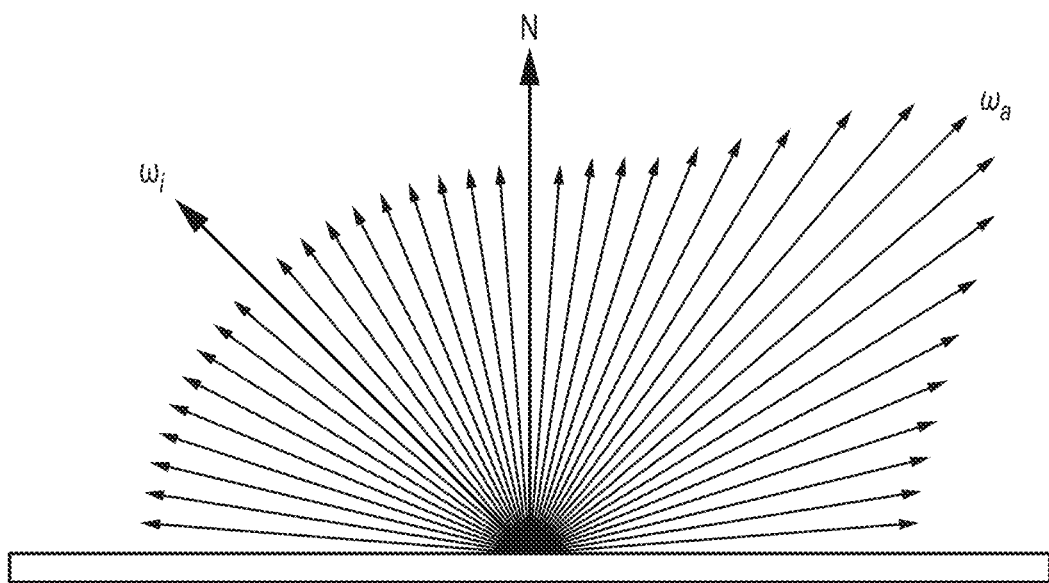
FIG. 5 is a schematic diagram of a scattering distribution in accordance with embodiments of the present description.

Referring also to FIG. 5, in a typical ray tracing application, for a set of rays (e.g. from a compact light source) the application computes the incoming radiance (itself either direct or previously reflected) onto a point on the model having a particular BSDF, BRDF, and/or BTDF. The incoming radiance is combined (e.g. multiplied) with the BSDF, BRDF, or BTDF for a particular contributing component response, and the result is added to the pixel value at that point on the model. As shown in FIG. 5, a typical scattering pattern for ray path $\omega_i$ in a BSDF will have a bias towards a mirror reflection direction $\omega_a$, but may scatter in any direction. Accurately modelling such behaviour is one reason ray tracing can be computationally expensive.

Using the colour information of the model at respective points and the corresponding BSDF, BRDF and/or BTDF for that point (i.e. for a particular material represented by a given point), the behaviour of the rays for a given final viewpoint can thus be calculated, with the ray reflectance or scattering for example determining the realistic distribution of glints and highlights on the surface of the vehicle.

Separate BSDFs, BRDFs, or BTDFs may be used for each contributing component; hence as a non-limiting example a BSDF may be used for the diffuse component, a BRDF for the specular component and in this example also a for the coat component (though a BTDF could also be used for such a coat component). It will be appreciated that either a BSDF, BRDF, or BTDF may be used as appropriate, and so hereinafter a reference to a BSDF encompasses a reference to a BRDF or a BTDF as appropriate, unless otherwise stated.

As shown in FIG. 4, performing ray tracing using the colour properties of the object and diffuse material properties of a BSDF (200-BSDF-D) results in the diffuse image component 200-D. Similarly using the specular or reflective material properties of a BSDF (200-BSDF-S) results in the specular image component 200-S. Likewise the material properties of a BSDF (200-BSDF-C), in this case typically also specular, results in a coat image component 200-C. Combining these components results in the final ray traced image 200.

The problem however, as previously stated, is that calculating the reflected and scattered paths of rays as they intersect with different surfaces having different BSDFs, and summing the results for each pixel of a scene at a particular viewpoint, is both computationally expensive and also potentially highly variable.

Embodiments of the present description therefore seek to replace the ray tracing step of FIG. 4 with something else that has a more predictable computational load for a suitable quality of final image.

Figure 6:
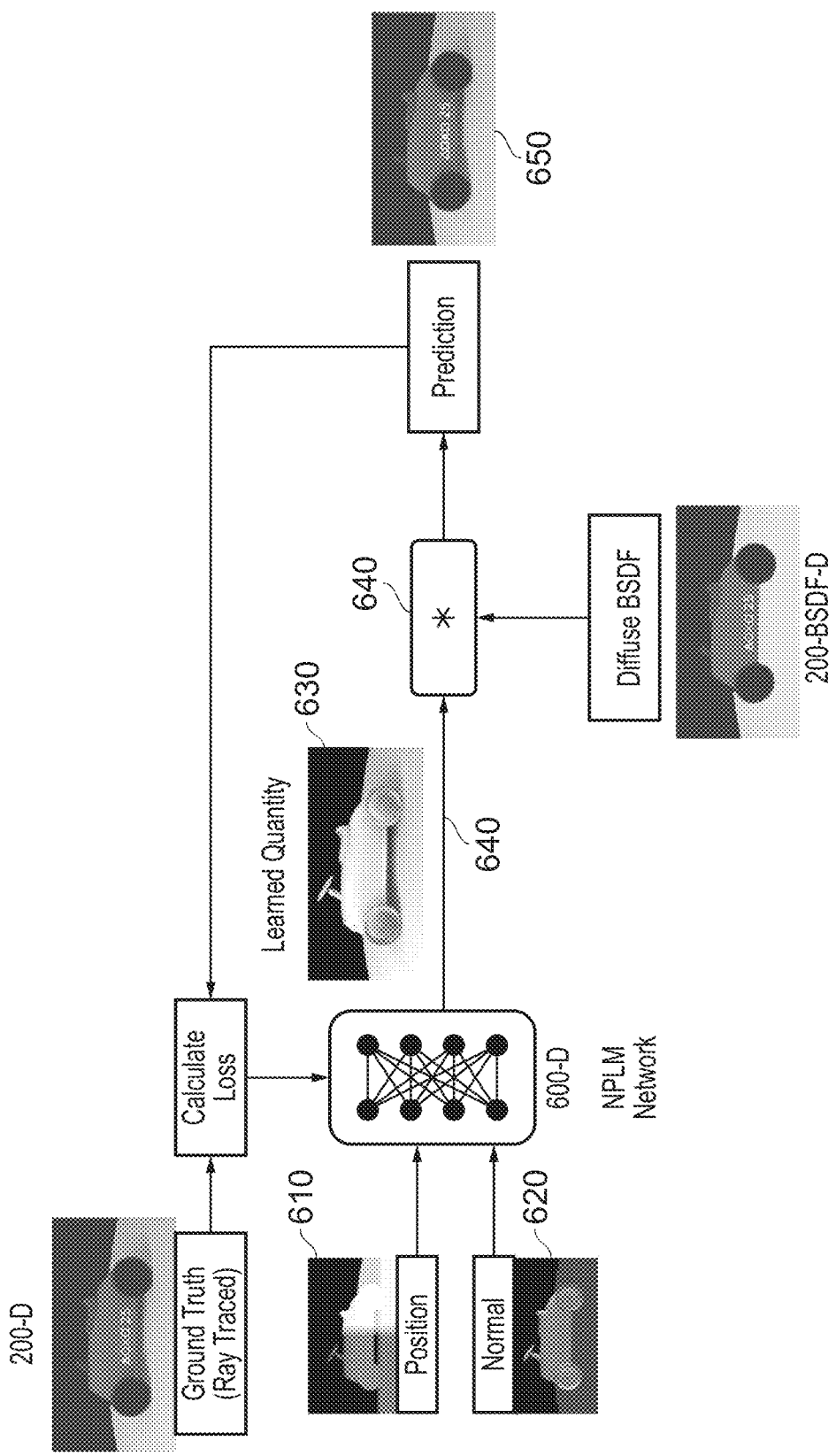
FIG. 6 is a schematic diagram of a training scheme for a machine learning system in accordance with embodiments of the present description.

Referring now also to FIG. 6, in embodiments of the present description, a respective machine learning system is provided for each contributing component of the image (e.g. diffuse, specular, and optionally coat or any other contributing component).

The machine learning system is typically a neural network, as described later herein, that is trained to learn a transform between the BSDF (e.g. 200-BSDF-D) and the ray-traced ground truth (e.g. 200-D) of the contributing component of the image, for a plurality of images at different viewpoints in the scene.

Put another way, if the ray traced image (or one of the contributing components) is a combination of how lighting plays over an object and the BSDF describing how that object reacts to light, then by taking the ray traced image and uncombining it with the BSDF, the result is a quality that may be referred to as 'radiance' or 'shade', but more generally describes how the light plays over the object (as computed in aggregate by the ray tracing process).

If the machine learning system or neural network can learn to predict this quality, then it can be combined again with the BSDF to produce a predicted image approximating the ray-traced image. The network may thus be referred to as a neural precomputed light model or NPLM network.

More specifically, for a given position on a hypothetical image of an object, and a direction of view, the machine learning system or neural network must learn to output a value that, when combined with the BSDF for that same position/pixel, results in a pixel value similar to that which would arise from raytracing the image at that pixel. Consequently during training it generates an internal representation of the lighting conditions (e.g. due to point lights or a skydome) and surface lighting properties implied from the training images.

Hence in an example embodiment, an image may be rasterised or otherwise generated at a given viewpoint, which would fill the image with pixels to then be illuminated. For each of these notional pixels there is a corresponding 3D position in the scene for which the appropriate 'radiance' or shade' can be obtained using the NPLM network.

FIG. 6 shows a training environment for such a network, and specifically as an example only, a network 600-D for the diffuse contributing component.

The inputs to the network for the diffuse contributing component are an (x,y,z) position 610 on the object or scene (for example corresponding to a pixel in the image) and the normal 620 of the object/scene at that point. The normal N is used instead of the viewpoint direction because for the diffuse contributing component, the illuminance can be considered direction/viewpoint independent, and so the normal, as a known value, can be used for consistency. These inputs are illustrated notionally in FIG. 6 using representative values of each for the car image in the present explanatory example.

Optionally additional inputs may be provided (not shown), such as a roughness or matt-to-gloss scalar value that may optionally be derived from the relevant BSDF.

The output of the NPLM network (as explained later herein) is a learned quality of light or illuminance 630 for the input position that, when combined 640 with the relevant diffuse BSDF (200-BSDF-D) for the same position produces a predicted pixel value for the (x,y) position in a predicted image 650.

FIG. 6 illustrates that the per-pixel difference between the predicted pixel and the ground truth pixel of a target ray-traced diffuse component 200-D is used as the loss function for training the network, but this is not necessary; rather, the ground truth image can be uncombined with the BSDF (i.e. by performing an inverse function) to produce an proxy for how the ray traced light cumulatively affected the object in the image for each (x,y) pixel, and this is the quality that the network is training to learn.

Hence the error function for the network is based on the difference between its single pixel (x,y) output value and the corresponding single (x,y) pixel of the ground truth image when uncombined from the corresponding BSDF for that position.

Since the pixels of the ground truth image can be uncombined from the corresponding BSDF for each position once in advance, the network can be trained without needing to combine its own output with any BSDF to generate an actual predicted image pixel. This reduces the computational load of training.

As noted above, the learned quality output by the trained neural network captures how the light in the environment plays over the object or scene as a function of the position of surfaces within the scene and as a function of viewpoint. As such it effectively generates an internal representation of a light map for the scene and a surface response model. How this occurs is discussed in more detail later herein.

Figure 7:
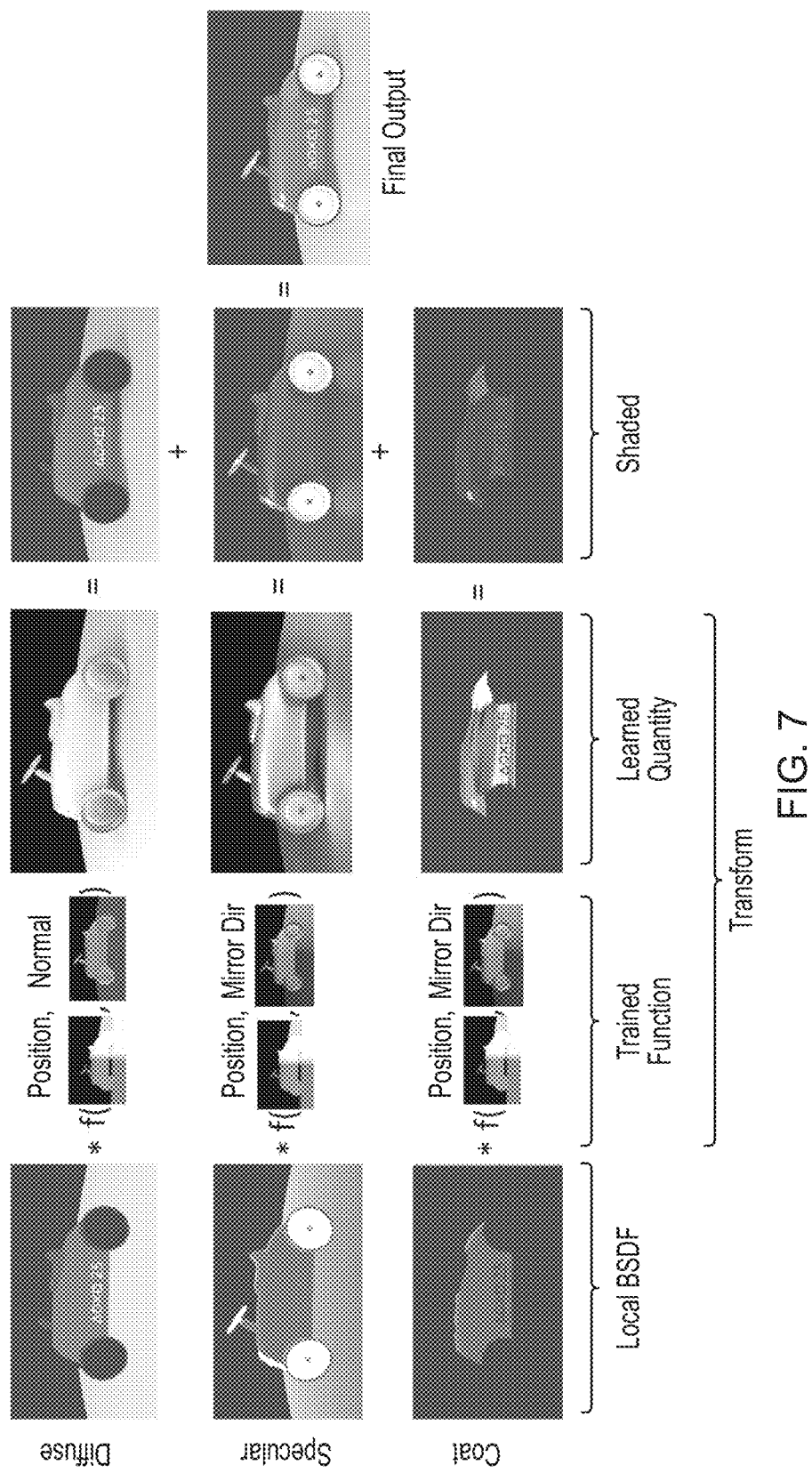
FIG. 7 is a schematic diagram of a render path for a rendered image in accordance with embodiments of the present description.

Referring now to FIG. 7, in summary for each contributing component of the final output image, a machine learning system is trained to perform a transform that is applied to the BSDF local to the position on the object/scene for that contributing component. The transform is a trained function, based on the (x,y,z) position of points on the object/scene and a direction value. As noted previously, depending on the number of contributing components of the final image, there may be any or one, two, three, four or possibly more machine learning systems employed. The term 'trained function' may be used hereafter to refer to a machine learning system that has learned such a transform.

As noted for the diffuse component the direction value can be assumed to equal the normal at a given point as the diffuse shading is assumed to be direction-invariant.

Meanwhile for the specular component, which is at least partially reflective and so will vary with view point, the direction value is or is based on the viewing angle between the (x,y) position of a current pixel at the image view point (which will have a position in the virtual space) and the (x,y,z) position of the object as input to the machine learning system, thereby providing a viewpoint dependent relationship between the input point on the scene surface and the current pixel for which the learned quantity is to be output.

In this case the coat component is also specular and so uses a similar viewpoint or viewpoint based direction for an input as well.

The direction value for direction dependent components may thus be the view direction between the output pixel position and the object surface position, or a value based on this, such as the surface mirrored viewpoint direction (i.e. the primary direction that the viewpoint direction would reflect in, given the normal of the surface at the input position). Any suitable direction value that incorporates information about the viewpoint direction may be considered.

In each case, the trained function encapsulates the learned quality, as described previously herein. Combining the appropriate BSDF with the network output for each position allows the shaded images for each component to be built up. Alternatively or in addition combining the pixel values for the shaded images from each component generates the final output.

It will be appreciated that during the rendering of an image, not all of the image may be subject to ray tracing, and similarly not all of an image may be generated using the above techniques. For example, NPLM networks may be trained for specific objects or materials based on ground truth ray traced images with representative lighting.

When these objects or materials are to be subsequently rendered in real time using the apparent ray tracing provided by the trained functions described herein, the relevant NPLM networks are loaded into memory and run for the relevant surface positions and viewing directions in the scene to produce their contributions to the relevant pixels, when combined with the appropriate BSDFs. Other pixels may be rendered using any other suitable techniques (including ray tracing itself).

Typically the appropriate the machine learning system(s) are selected and loaded into a memory used by the GPU based on the same asset identification scheme used for selecting and loading a texture for the object or material. Hence for example if an object has an ID '1234' used to access associated textures, then this ID can also be associated with the relevant machine learning system(s). Conversely if a texture has an ID '5678' that is associated with an object (e.g. where the texture represents a material common to plural objects), then this ID can also be associated with the relevant machine learning system(s). In this way the entertainment device can use a similar process to load the machine learning systems as it does to load the textures. It will be appreciated that the actual storage and access techniques may differ between textures and machine learning systems, particularly if textures are stored using lossy compression that would impact on the operation of a decompressed machine learning system. Hence the machine learning system may be stored without compression or using lossless compression, or lossy compression where the degree of loss is low enough that the decompressed machine learning system still operates adequately; this can be assessed by comparing the output error/cost function of the machine learning system for incremental degrees of loss in compression, until the error reaches an absolute or relative (to the uncompressed machine learning system) quality threshold.

Figure 8:
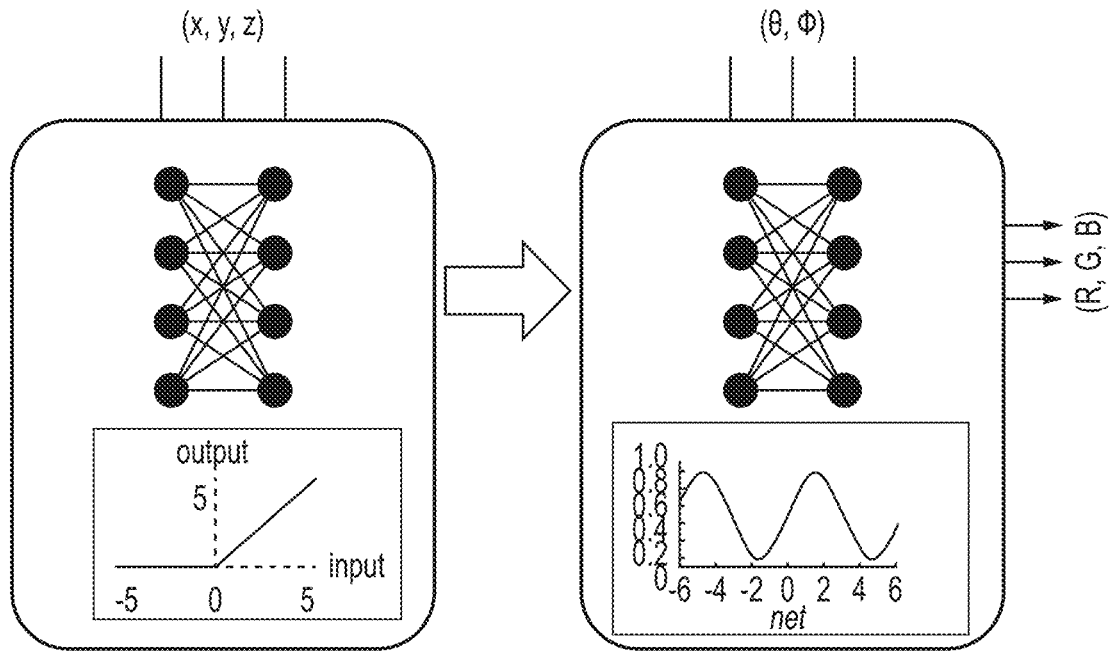
FIG. 8 is a schematic diagram of a machine learning system in accordance with embodiments of the present description.

Turning now to FIG. 8, in embodiments of the present description, the machine learning system or NPLM network may be any suitable machine learning system. Hence for example a single neural network may be trained using the position and viewpoint direction as inputs, and generate RGB values for the learned property as outputs.

However, a particularly advantageous network comprises a distinct split architecture.

As shown in FIG. 8, in a non-limiting example the network comprises two parts. The first part may be thought of as the position network, whilst the second part may be thought of as the direction network.

Each of these networks may have 3 or more layers, and use any suitable activation function.

The position network receives the previously mentioned (x, y, z) position for a point in the object/scene as input, and outputs an interim representation discussed later herein.

The direction network receives this interim representation and also the direction input (e.g. the normal, or the pixel viewpoint or surface point mirrored pixel viewpoint direction or other viewpoint based direction value, as appropriate) for example in a ($\theta$, $\phi$) format, or as a normalised (x, y, z) vector, or similar. It outputs RGB values corresponding to the previously mentioned leaned quantity for the (x,y) position (and hence pixel viewpoint) of a current pixel in an image to be rendered from a virtual camera position in a space shared with the object/scene.

Hence in a non-limiting example, the position network has 3 layers, with 3 input nodes (e.g. for the x, y, z position) on the first layer, 128 hidden nodes on the middle layer, and 8 outputs on the final layer.

Whilst any suitable activation function may be chosen for the network, a rectified linear unit (ReLU) function has been evaluated as a particularly effective activation function between the layers of the position network. It generalizes well to untrained positions and helps to avoid overfitting.

Similarly in the non-limiting example, the direction network has 4 layers, with the 8 outputs of the position network and 2 or 3 additional values for the direction feeding into 128 nodes on a first layer, then feeding on to two further layers of 128 nodes, and a final 3 outputs on the final layer corresponding to R,G,B values for the learned quantity at the current pixel. This could then combined (e.g. multiplied) with the BSDF for that position to get the final pixel contribution from this trained function (e.g. diffuse, specular etc), though as noted previously this is not required during training.

Whilst any suitable activation function may be chosen for the direction network, a sine function has been evaluated as a particularly effective activation function between the layers of the direction network. Because the light behaviour variation in the angular domain is large and contains details at many angular frequencies, but is based on a low dimensional input (e.g. a normalised x,y,z vector), the sine activation function has been found to be particularly good.

Notably therefore the two halves of the network may use different activation functions.

The network however is treated as a split-architecture network rather than as two separate networks because notably the training scheme only has one cost function; the error between the RGB values output by the direction network and the target values from the corresponding pixel of the ground truth ray traced image, after being uncombined with the appropriate BSDF.

This error is back-propagated through both networks; there is no separate target value or cost function for the position network. Hence in practice the output layer of the position network is really a hidden layer of the combined network, augmented with additional inputs of direction values, and representing a transition from a first activation function to a possible second and different activation function within the layers.

As noted previously, the neural network builds a light model for the lit object, material, or scene. In particular, in the non-limiting example above the position network effectively sorts the (x, y, z) positions into lighting types (e.g. bright or dark, and/or possibly other categories relating to how the light interacts with the respective BSDF, such as relative reflectivity or diffusion); the interim representation output by this part may be thought of as an N-dimensional location in a lighting space characterising the type of light at the input position; it will project positions in different parts of the scene to the same N-dimensional location if they are lit in the same way. A position network trained for a specular component may have more outputs that one for a diffuse component; for example 32 outputs compared to 8, to take account of the greater variability in types of lighting that may occur in the specular component.

The direction network then models how light the light model behaves when viewed in the surface at the input position at a certain input angle for the lit object, material, or scene, to generate the learned property for that location in the image.

Hence in summary, the position and direction networks are trained together as one to predict a factor or transform between a BSDF descriptive of a surface property, and the desired rendered image of that surface. The networks can then be used instead of ray tracing for renders of that surface. Typically but not necessarily the networks are trained on just one contributing component of the image, such as the diffuse of specular component, with a plurality of networks being used to produce the components needed for the final image or image portion, although this is not necessary (i.e. in principle a network could be trained on a fully combined image or a combination of two or more contributing components, such as all specular or all diffuse contributions).

Training

The network is trained as described elsewhere herein using a plurality of ray traced images of the object, scene, or surface taken from a plurality of different viewpoints. This allows the network to learn in particular about how specular reflections change with position. The viewpoints can be a random distribution, and/or may for example be selected (or predominantly selected) from within a range of viewpoints available to the user when navigating the rendered environment, known as the view volume; i.e. the volume of space within which viewpoints can occur, and so will need to be included in the training.

In an embodiment of the present description, the training data can be generated as follows.

It will be appreciated that for any machine learning system the training data used to train the system can be key to its performance. Consequently, generating training data that leads to good performance is highly beneficial.

As described elsewhere herein, the training data for the NPLM systems described herein is based on a set of high quality rendered images of a scene/object/material/surface (hereafter generically referred to as a scene), typically uncombined with one or more relevant distribution functions (e.g. a BSDF, BRDF, or the like as described elsewhere herein) so that the learned quality referred to herein can be provided as a direct training target, removing the computational burden of generating predicted images during training, and also ensuring that the error function is not derived at one remove from the output of the NPLM itself.

Different NPLMs may handle view dependent and view independent shading effects (e.g. diffuse, specular, etc), and so typically a single view of an object in a scene is not sufficient if the object has view dependent shading (e.g. specularity, or a mirror reflection, etc.).

Consequently the number and location of training data images can depend on not only the geometry of the scene (e.g. if an object is visible within the view volume), but potentially also the material properties of the objects in the scene also.

Hence in an embodiment of the present description, the NPLM training data, in the form of images of the scene taken at a plurality of camera viewpoints, can be generated at least in part based on the materials in the scene (e.g. material properties such as light response properties like a diffuse or specular response, but potentially also other material properties such as surface complexity—e.g. the present of narrow or broad spatial frequency components, structurally and/or texturally).

Notably these images are typically generated from a $3^{rd}$ party high quality renderer, to which access to internal data is not available. Hence only the final complete image may be available, and not any information (or control) about specific cast rays or their directions when performing shading within an image.

It is therefore desirable to generate and use a set of images that efficiently capture the appearance of the scene, for preferably all valid views within the view volume, for the purposes of training.

Figure 11:
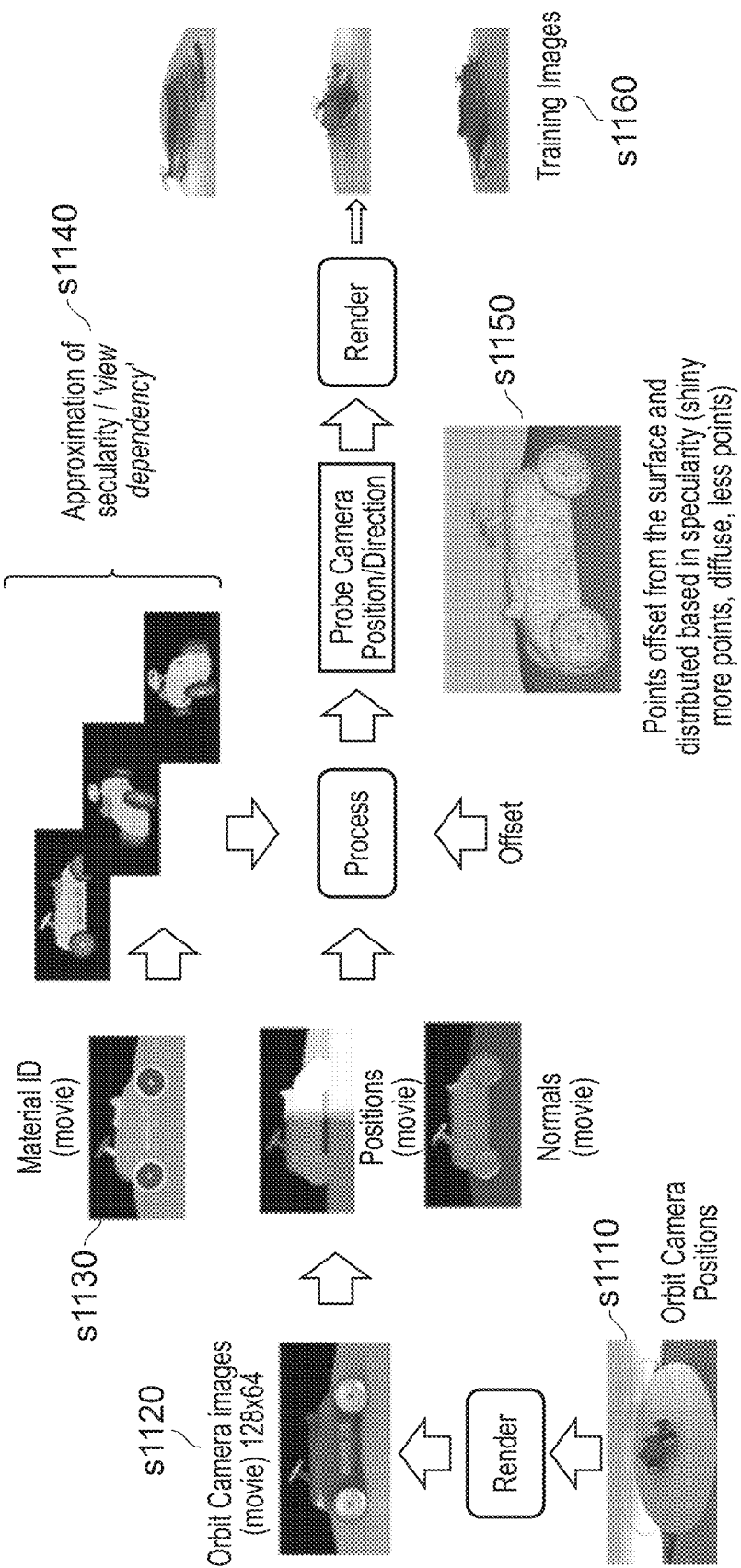
FIG. 11 is a schematic diagram of a process for generating a training set in accordance with embodiments of the present description.

Referring now to FIG. 11, to this end, in a step 1110 firstly a set of camera locations within the viewing volume are used to render a set of low resolution images. The locations may be equidistant or randomly distributed on a sphere around the scene (if it can be viewed from any angle, e.g. as a manipulable object), or on a hemisphere around the scene (if it is based on the virtual ground, and so not viewable from underneath), or on a ring around the scene (if it is viewed from a ground based viewpoint, e.g. a first person view of an avatar). Such a ring may be at a fixed height corresponding to the avatar viewpoint, or may occupy a height range, e.g. as a viewing cylinder encompassing one or more of a crouch and jump height for the avatar viewpoint.

Step 1110 is illustrated in FIG. 11 with an orbit (ring) of camera positions around the example car object.

The number of camera locations in this initial set may as few as one, but is typically three or more, and more typically is in the order of tens or hundreds. For example, one camera per degree of orbit would result in 360 cameras. In the present example, 200 cameras are used as a non-limiting number.

The resolution per image is low; for example 128×84 pixels. An example image is shown for step s1120.

Notably for each pixel of each image, in step s1130 metadata is associated with it comprising the 3D position of the scene surface corresponding to the pixel, the normal of the scene surface corresponding to the pixel, and optionally a material ID or similar material surface identifier or descriptor, such as a texture ID or object ID.

In a first instance of a viewpoint selection process, the 3D positions of the scene surfaces rendered by pixels in some or typically all of these low resolution images are collated to identify which positions within the scene are visible within the first set of camera positions. These are the 3D positions on which the NPLM would benefit from being trained on.

Hence optionally, for each 3D position identified as being rendered in at least one of the initial low resolution images, a new position in 3D space is calculated as offset from that position along the surface normal. The distance of the offset from the surface is a variable that can be modified. This new position is a candidate viewpoint for a virtual camera to generate a high quality (e.g. high resolution ray traced) render.

However, this may result in a large number of potential high quality ray-traced renders to generate as training images, which would be computationally burdensome, and might also include significant redundancy when used as a training set for the NPLM.

Consequently in a first instance it is desirable to filter or cull these candidate viewpoint positions in some manner that is relevant and useful to the training of the NPLM on the scene.

In particular, it is beneficial to have more training examples for parts of the scene that comprise view dependent materials (e.g. specular or shiny) than view independent materials (e.g. diffuse or matt).

Accordingly, one of two approaches may be taken.

In a first approach, in step 1140 for each of the candidate viewpoints corresponding to a normal at a surface position, the corresponding material property of the surface at that position is reviewed. As noted above, in particular its diffuse or specular response, or it translucency or the like, may be used.

In practice, this can be done by use of a look-up table associating the material ID or similar with a value indicating how diffuse or specular (e.g. matt or shiny) the material surface is. More particularly, this property can be represented, as a non-limiting example, by a value ranging from 0 for completely diffuse to 1 for a mirror reflection. This can be treated as an input to a probability function, so that specular or shiny (view dependent) materials have a comparatively high probability, and diffuse or matt (view independent) materials have a comparatively low probability.

The probability function is then used to retain candidate camera positions; a higher proportion of camera positions facing specular surfaces will therefore be retained, compared to diffuse surfaces.

Conversely if the value conventions are reversed (e.g. low and high probabilities are reversed) then the probability function can be used to cull candidate camera positions to the same effect.

In a second approach, alternatively or in addition in step s1140 the variability of pixel values corresponding to the same 3D position of the scene surface as viewed in the low resolution images can be evaluated, to determine a pixel value variance for each captured 3D position. In this way, view invariant (e.g. diffuse or heavily shadowed) surface positions will have a low variance (i.e. pixels showing that position in different low resolution images will be similar), whilst view dependent (e.g. specular or shiny) surface positons will have a high variance (i.e. pixels showing that position in different low resolution images will show a wider range of values for example as some catch glints or reflections of light). This variance, or a normalised version thereof, can again be used as an input to a probability function so that specular or shiny (view dependent) materials have a comparatively high probability, and diffuse or matt (view independent) materials have a comparatively low probability.

Hence in either case, in step s1140 an estimate of the view dependency of the light responsiveness of the material at each captured 3D position in the view volume is obtained (either based on material property or pixel variability, or potentially both), and this can be used as an input to a probability function.

The probability function is then used at step s1150 to decide whether a respective candidate viewpoint is kept or culled, with viewpoints centred on view dependent surfaces being retained more often than those centred on view independent surfaces.

The output range of this probability function can be tuned to generate approximately the desired overall number of camera viewpoints for training based on the original number of possible candidates and the final desired number, or alternatively a probability function can be applied for successive rounds of retention/culling until the number of remaining camera viewpoints is within a threshold value of the desired number.

In either case the result is a manageable number of camera viewpoints randomly distributed over the desired viewing volume, but with a variable probability density that is responsive to the material property (e.g. shininess or otherwise) of the material immediately centred in front of the camera. This is illustrated by the constellation of surviving points in the figure for step s1150. In practice, the camera positions can be further away from the object/scene surface than is shown in this figure, but the points have been placed close to the surface in the figure in order to illustrate their distribution.

The amount of the manageable number of camera viewpoints can be selected based on factors such as the desired performance of the resulting NPLM, the computational burden of generating the high quality ray traced images and training the NPLM on them, memory or storage constraints, and the like. A typical manageable number for training purposes may be, as a non-limiting example, between 10 and 10,000, with a typical number being 200 to 2000.

Finally, in step s1160 the images are rendered at the surviving viewpoints. Optionally, as shown in FIG. 11, these renders are generated using a wider angle virtual lens than the lens used for the initial low resolution images or the lens used during game play.

This tends to result in rendering too much of the scene (i.e. parts that are not directly visible from the view volume points); this tends to make the NPLM output more robust, particularly for view positions near the edges of the view volume, and also in case of unexpected extensions of the view volume e.g. due to object clipping in game, or minor design modifications.

Whilst the above approach generated candidate camera viewpoints based on the normals of the scene surface that were captured in the initial low resolutions images, this is not the only potential approach.

One possible issue with the above approach is that whilst a view-invariant position in the scene may be imaged by a camera pointing toward it along the normal at that position, it is only rendered from different angles in other images that at nearby positions, and in turn these angles are dictated by the normal of the scene surface at those positions. As a result whilst there may be comparatively more images captured on and near view dependent parts of the scene, the images themselves are potentially unduly influenced by the geometry of the scene itself.

Accordingly, returning to the initial low resolution images, in another instance of the viewpoint selection process, a potential viewpoint position may be considered for each pixel of each low resolution image (or at least those pixels that represent a surface in the scene). In the above example of 200 images at 128×84 pixels, this equates to up to 1.6 million candidates. These images typically capture multiple instances of a given position on the scene from different angles, independent of the topology of the scene itself. As a result the training set is potentially more robust.

Again the surface material (and/or pixel variance) derived view dependency of the surface position corresponding to a given pixel within a low resolution image, and hence to a candidate viewpoint, can be used to drive a probability of retaining or culling that viewpoint. In this way the 1.6 million candidate viewpoints can again be culled down to a manageable number.

In this case, because there can be multiple views of the same position within the scene, it is possible that the resulting distribution of camera views is biased towards those positions within the scene that are most visible, as opposed to only most view dependent; for example, if one (diffuse) position in the scene is visible in 20 times more images than one (specular) position, then even though it is more likely that the viewpoints looking at the diffuse position will be culled, because there are twenty times more of them the eventual result may be that there are more images of the diffuse position than the shiny one.

Hence optionally, the probability of retaining or culling a viewpoint can be normalised based on how many viewpoints are centred on the same position in the scene (albeit from different angles). This normalisation may be full (so in the above example, the probability of retaining an image of the diffuse position is made 20 times less, so the effect of the number of views is removed). Alternatively the normalisation may be partial; so that for example, the probability of retaining an image of the diffuse position is only made 10 times less so the effect of the number of views is significantly reduced, but not totally removed; this would mean that areas that are potentially seen a lot by the user would also get more training examples, independent of whether they also got more training examples due to being view dependent (e.g. specular/shiny).

In principle, both sets of viewpoints (surface normal based viewpoints and low resolution image pixel based viewpoints) could be generated and culled to create a combined viewpoint set prior to generating high quality ray traced renders for training purposes; indeed in any case there is likely to be a subset of low resolution image pixel based viewpoints that in effect are coincident with the normals of at least some of the visible surface positions.

Variant Training Techniques

The above second approach optionally considers the issue of compensating for multiple views of the same position in the scene when culling available viewpoints. In addition to enabling control of training bias, it also reduces training times for this second approach by reducing repetitions for certain positions in the scene.

However, alternatively or in addition the training time can be (further) reduced as follows.

As before, select an initial set of viewpoints within (or on the surface of) a view volume.

Now optionally, generate the initial low resolution images for a set of positions within the view volume.

Now optionally, then generate candidate viewpoints either based on normals of the positions in the scene found in the low resolution images, and/or based on lines between pixels of the low resolution images and the represented positions in the scene, as described previously herein.

Again optionally, these viewpoints can be culled with a probability based on the degree of specularity/diffusion of the respective position in the scene. Further optionally, where there are multiple images centred on a respective position, the probability can be modified to at least partially account for this.

Hence, depending on the approach taken, the result is a generated series of viewpoints—either the original distribution optionally used to generate the low resolution images, or a distribution arising from one of the above generation-and-culling techniques.

In either case, in an embodiment of the description, once a viewpoint is generated (and optionally confirmed as not being culled, as appropriate), it is provided to or queued for a ray tracing process to generate the high quality image, optionally in a wide angle form as described elsewhere herein.

Training on generated image begins when a respective image is complete; hence there is a parallel process of generating training images (which due to being ray-traced images, takes some time) and training on those images (which can also take some time). This avoids the issue of having to wait for the complete training set to be generated before training can begin.

Optionally, where viewpoints have been generated, or where generated viewpoints are selected to determine if they are to be culled, the selection of a viewpoint from those available can be random, so that the eventual production sequence of ray traced images is also random within the final set of viewpoints being used.

This reduces the chance of the NPLM becoming initially over trained on one section of the scene, and also means that if, for example, the training has to be curtailed due to time constraints, the NPLM will still have been exposed to a diverse set of views of the scene.

In another variant training technique, if control of the ray tracing application is available and allows it, then optionally only a subset of pixels for an image from a given viewpoint need be rendered; whether based on the original set of viewpoints or a viewpoint that was not culled, there may be parts of a scene within a given image that have been rendered a number of times in other images within the training set. For example, if a position in the scene has already been rendered more than a threshold number of times, it may be skipped in the current render as there are already a sufficient number of training examples for it. Unrendered parts of an image can be tagged with a reserved pixel value acting as a mask value. Consequently training can be performed using input positons, direction information and a target value for unmasked pixel positions only. This can significantly reduce the redundancy within the training set, and also the associated computational load, both when ray tracing the training images and when training the NPLM.

Exceptions can optionally be applied. For example pixels near the centre of the image may always be rendered, as the central pixel typically relates to the position in the scene that was selected (or not culled), possibly as a function of its surface properties as described elsewhere herein—it is typically the pixels in the non-central parts of an image that are likely to capture unintended and unwanted repetitive points within the scene.

Network Configuration

As noted above, a position network (i.e. the first part of the split-architecture network described herein) may have a different number of outputs depending on whether it is trained for a diffuse of specular type image component. It will be appreciated that this is a specific instance of a more general approach.

In general, the capability of the NPLM may be varied according to the complexity of the modelling task it is required to do, either by increasing or reducing the capability from a notional default setup.

In a first aspect, the capability may be varied based on the size of the NPLM (e.g. the number of layers, the size of layers and/or the distribution of layers between parts of the NPLM).

Hence optionally the size can vary according to the type of contributing component the NPLM is modelling (e.g. diffuse, specular, or translucent/transmissive).

In particular, the size of the position network may be beneficially made larger for specular or translucent/transmissive components compared to diffuse components, all else being equal, due to the greater variability of lighting responses inherent in these components. For similar reasons, the size of the position network may be beneficially made larger for translucent/transmissive components compared to specular components, all else being equal, due to the combinations of partial reflection, transmission and internal reflection that may be involved.

The size may be varied by alteration to the number of hidden layers or the number of nodes within one or more such hidden layers. Similarly the size may be varied according to the number of output layers (for example the output layer of the position network, which is also a hidden or interface/intermediate layer between the position network and direction network of the overall NPLM network). An increase in the number of layers typically increases the spatial distortion that the network is capable of applying to the input data to classify or filter different types of information, whilst an increase in the number of nodes in a layer typically increases the number of specific conditions within the training set that the network can model, and hence improves fidelity. Meanwhile an increase in the number of output nodes (where these are not selected to map onto a specific format, as in the output of the position network) can improve the discrimination by the output network (and also by a subsequent network operating on the output node values) by implementing a less stringent dimension reduction upon the internal representation of the dataset.

Alternatively or in addition, the size of the direction network can vary according to the type of contributing component the NPLM is modelling (e.g. diffuse, specular, or translucent/transmissive).

As noted above, the input layer of the direction network can change in size to accommodate a higher dimensional output of the position network within the overall NPLM split-architecture network.

Similarly the number of layers and/or size of layers can be varied to similar effect as then outlined for the position network, i.e. increases in discriminatory capability and also model fidelity.

As with the position network, the size of the direction network may be beneficially made larger for specular or translucent/transmissive components compared to diffuse components, all else being equal, due to the greater variability of lighting responses inherent in these components. For similar reasons, the size of the direction network may be beneficially made larger for translucent/transmissive components compared to specular components, all else being equal, due to the combinations of partial reflection, transmission and internal reflection that may be involved.

Hence the NPLM (e.g. the position network, the direction network, or both) may have its capabilities changed (e.g. increased number of layers, internal nodes, or input or output dimensionalities), for example to improve discriminatory capabilities (for example due to more hidden layers or output dimensionality) and/or to improve model fidelity (for example due to more nodes in hidden layers), responsive to the demands of the lighting model required; with for example a diffuse contributing component typically being less demanding than a specular one.

Conversely, from a notional standard or default set-up for an NPLM, instead of increasing capability an NPLM may be beneficially altered to reduce its capability (e.g. by steps opposite those described above for increasing capability) where appropriate (e.g. for a diffuse component). In this case the benefit is typically in terms of reduced memory footprint and computational cost.

In addition to the type of reflection property (or properties) of a material as modelled by different contributing channels, alternatively or in addition the capability of an NPLM may be increased or decreased in response to other factors relating to the complexity of the lighting model/render process.

For example, a diffuse light source (such as a sky dome) may be less complex than a point light source, as there is less spatial/angular variability in the lighting the impinges on the object/scene. Conversely, a sky dome with significant spatial variability of its own (e.g. showing a sunset) might be more complex. The complexity of the light source may be evaluated based on its spatial and colour variability, for example based on an integral of a 2D Fourier transform of the lit space without the object/scene in it, typically with the DC component discounted; in this case a uniform sky dome would have a near-zero integral, whilst one or more point sources would have a larger integral, and a complex sky-dome (like a city scape or sunset) may have a yet larger integral. The capability of the NPLM (e.g. the size) could be set based on this or any such light source complexity analysis, for example based on an empirical analysis of performance.

Similarly, moving, dynamic or placeable lights may require increased NPLM complexity, as they create changing lighting conditions. In this case the input to the NPLM may comprise a lighting state input or inputs as well as the (x,y,z) object position for the specific part of the object/scene being rendered as for the output pixel. Hence for a model for a scene where the sun traverses the sky, an input relating to the time of day may be included, which will correlate with the sun's position. Other inputs to identify a current state of a light source may include an (x,y,z) position for one or more lights, an (r) radius or similar input for the light size, and/or and RGB input for a light's (dominant) colour, and the like. It will be appreciated that the training data (e.g. based on ray traced ground truths) will also incorporate examples of these changing conditions. More generally, where an NPLM it trained to model dynamic aspects of the environment, the training data will comprise a suitable representative number of examples.

In the case of the sun, the traversal for a whole day may need to be modelled by several NPLMs in succession (e.g. modelling dawn, morning, midday, afternoon and dusk), for example so to avoid the memory footprint or computational cost of the NPLM growing larger than a preferred maximum, as described elsewhere herein.

Similarly, moving, dynamic or placeable objects within the scene may require increased NPLM complexity if they are to be rendered using the NPLM (optionally the NPLM can be used to contribute to the render of static scene components only, and/or parts of the scene that are position independent). Hence again in this case the input may for example comprise object position and/or orientation data.

Alternatively or in addition, other factors may simplify the modelling of the NPLM and so allow the capabilities of the NPLM to be reduced (or for the fidelity of the model to be comparatively improved, all else being equal). For example, if the rendered scene comprises a fixed path (e.g. on a race track, within crash barriers), then training from viewpoints inaccessible by the user can be reduced or avoided altogether. Similarly if the rendered scene comprises limited or preferred viewing directions (e.g. again on a race track where most viewing is done in the driving direction), then training for different viewpoints can reflect the proportional importance of those viewpoints to the final use case.

Similarly, where parts of a scene may be viewed less critically by the user because they are background or distant from a focal point of the game (either in terms of foveated rendering or in terms of a point of interest such as a main character), then the NPLM may be made comparatively less capable. For example, different NPLMs may be trained for different draw distances to an object or texture, with capability (e.g. size) reducing at different draw distances/level of detail (LOD).

Alternatively or in addition, as noted elsewhere herein an NPLM can be trained for a specific scene, object, material, or texture. Consequently the capability of the NPLM can be varied according to the complexity of the thing whose illuminance it represents. A large or complex scene may require a larger NPLM (and/or multiple NPLMs handling respective parts, depending on the size of the scene and resultant NPLMs). Similarly a complex object (like a car) may benefit from a more capable NPLM than a simple object (like a sphere). One way of evaluating the complexity of the scene or object is to count the number of polygons, with more polygons inferring a more complex scene. As a refinement, the variance of inter-polygon plane angles can also be used to infer complexity; for example a sphere having the same number of polygons as the car model in the figures would have a very low angular variance compared to the car itself, indicating that the car is structurally more complex. Combining both polygon numbers and angular variance/distribution would provide a good proxy for the complexity of the scene/object for which illuminance is being modelled by the NPLM.

Similarly a complex material (like skin or fur) may benefit from a more capable NPLM than a simple material (like metal) (and/or multiple NPLM contributors). Yet again a complex texture (e.g. with a broad spatial spectrum) may benefit from a more capable NPLM than a texture with a narrower or more condensed spatial spectrum.

Whilst capability has been referred to in terms of size (number of inputs/outputs, number of layers, number of nodes etc), alternatively or in addition capability can be varied by the choice of activation function between nodes on different layers of the NPLM. As noted elsewhere herein, a preferred activation function of the position network is a ReLU function whilst a preferred and activation function of the direction network is a sin function, but other functions may be chosen to model other scenarios.

The capability of an NPLM may be made subject to an upper bound, for example when the memory footprint of the NPLM reaches a threshold size. That threshold size may be equal to an operating unit size of memory, such as a memory page or a partial or multiple group of memory pages, typically as selected for the purpose of accessing and loading textures for a scene/object/material. The threshold size may be equal to a texture or mimmap size used by the GPU and/or game for loading graphical image data into the GPU.

If the complexity of the NPLM would exceed this threshold, then the task it models may either have to be simplified, or shared between NPLMs, or the accuracy of the result may have to be accepted as being less.

Network Selection

The networks are trained during a game or application development phase. The developer may choose when or where NPLM based rendering would be advantageous. For example, it may only be used for scenes that are consistently found to cause a framerate below a predetermined quality threshold. In such cases, the networks are trained on those scenes or parts thereof, and used when those scenes are encountered.

In other cases, the developer may choose to use NPLM based rendering for certain objects or certain materials. In this case, the networks are trained for and used when those objects or materials are identified as within the scene to be rendered.

Similarly, the developer may choose to use NPLM based rendering for particular draw distances (z-distance), or angles/distance away from an image centre or user's foveal view, or for certain lighting conditions. In this case, the networks are trained for and used in those circumstances.

Similarly, it will be appreciate that any suitable combination of these criteria may be chosen for training and use.

Meanwhile as noted above, during use of the system there may be a plurality of NPLMs associated with a scene, for a plurality of reasons. For example, plural NPLMs may exist to model a large scene (so that each part is modelled sufficiently well by an NPLM within a threshold size and/or to a threshold quality of image reproduction). Similarly plural NPLMs may exist due to varying lighting conditions, levels of detail/draw distance, and the like.

The appropriate NPLM(s) for the circumstances may be selected and retrieved to GPU accessible working memory and run for the purpose of rendering at least part of an image. It will be appreciated that strategies applied to prefetching and caching textures and other graphical assets can also be applied to NPLMs.

Summary

Figure 9:
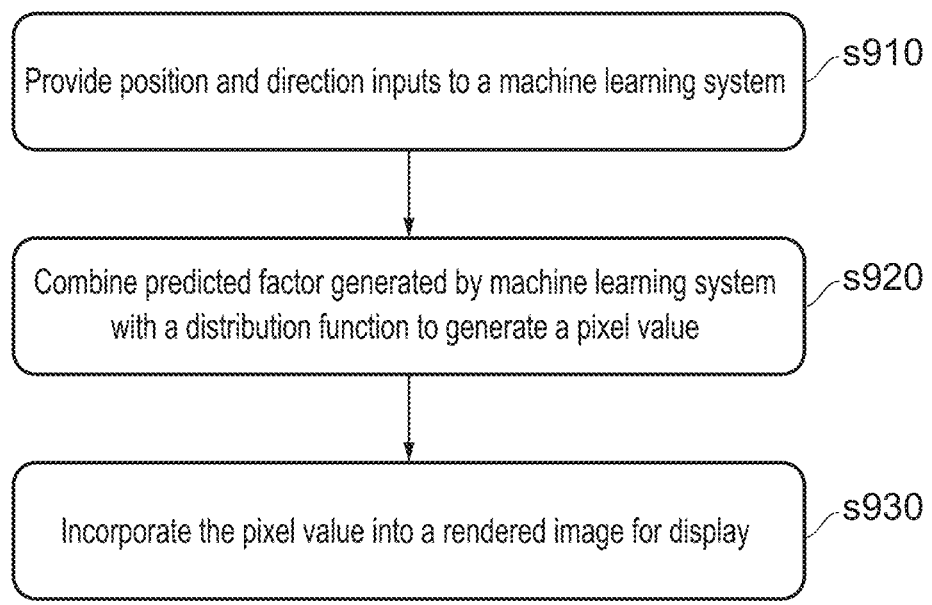
FIG. 9 is a flow diagram of an image rendering method in accordance with embodiments of the present description.

Referring now to FIG. 9, in a summary embodiment of the description, an image rendering method for rendering a pixel at a viewpoint comprises the following steps, for a first element of a virtual scene having a predetermined surface at a position within that scene.

In a first step s910, provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position, as described elsewhere herein.

In a second step s920, combine the predicted factor from the machine learning system with the distribution function to generate the pixel value corresponding to the illuminated first element of the virtual scene at the position, as described elsewhere herein.

And, in a third step s930, incorporate the pixel value into a rendered image for display, as described elsewhere herein. The image may then be subsequently output to a display via an A/V port (90).

It will be apparent to a person skilled in the art that one or more variations in the above method corresponding to operation of the various embodiments of the method and/or apparatus as described and claimed herein are considered within the scope of the present disclosure, including but not limited to that:

- the machine learning system was previously trained with a training set generated according to a method as described elsewhere herein;
- a respective machine learning system is trained for each of a plurality of contributing components of the image (e.g. diffuse, specular, coat, etc), a respective distribution function is used for each of the plurality of contributing components of the image, and the respective generated pixel values are combined to create the pixel value incorporated into the rendered image for display, as described elsewhere herein;
- the respective distribution function is one or more selected from the list consisting of a bidirectional scattering distribution function, a bidirectional reflectance distribution function, and a bidirectional transmittance distribution function, as described elsewhere herein;
- the machine learning system is a neural network, an input to a first portion of the neural network comprises the position, and an input the a second portion of the neural network comprises the output of the first portion and the direction, as described elsewhere herein;
  - in this instance, an activation function of the first portion is different to an activation function of the second portion, as described elsewhere herein;
    - in this case, the activation function of the first portion is a ReLU function and the activation function of the second portion is a sin function, as described elsewhere herein;
  - in this instance, the cost function of the neural network is based on a difference between the output of the second portion and a value derived from a ray-traced version of the pixel for a training image on which an inverse combination with the distribution function has been performed, as described elsewhere herein;
  - in this instance, the cost function for the network is back-propagated though both the second and first portions during training, as described elsewhere herein;
  - in this instance, the neural network is a fully connected network, as described elsewhere herein;
- the cost function of the machine learning system is based on a difference between the output of the machine learning system and a value derived from a ray-traced version of the pixel for a training image on which an inverse combination with the distribution function has been performed, as described elsewhere herein; and
- the machine learning system is selected and loaded into a memory used by a graphics processing unit based on the same asset identification scheme used for selecting and loading a texture for the first element of the scene.

Figure 10:
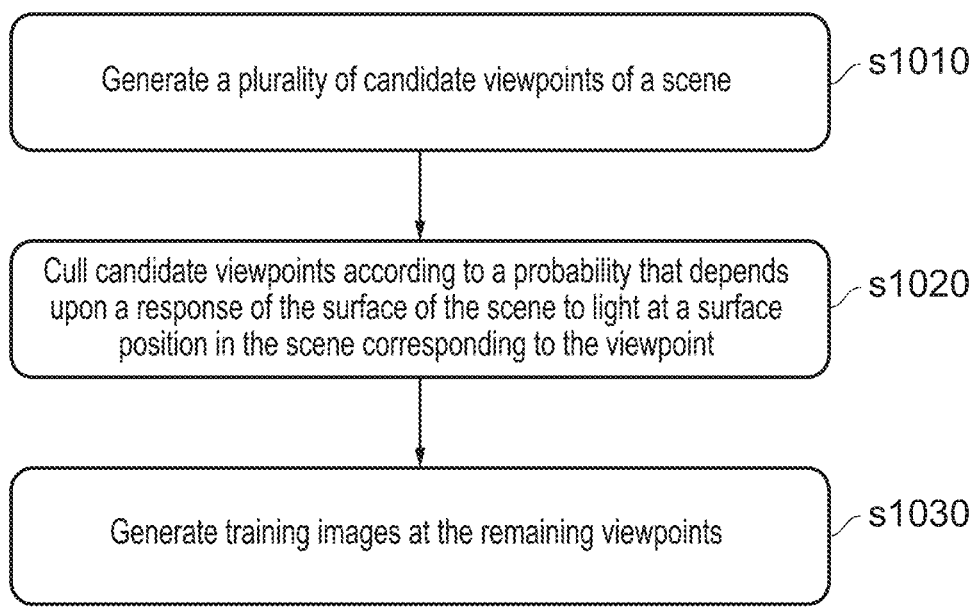
FIG. 10 is a flow diagram of method of generating a training set in accordance with embodiments of the present description.

Next, referring to FIG. 10, in another summary embodiment of the description, method of generating a training set for a neural precomputed light model (e.g. a machine learning model as described herein), comprising:

In a first step s1010, generating a plurality of candidate viewpoints of a scene, for example based on the initial viewpoints or viewpoints based on scene surface normals or lines of sight between image pixels and positions in the scene, as described elsewhere herein.

In a second step s1020, culling candidate viewpoints according to a probability that depends upon a response of the surface of the scene to light at a surface position in the scene corresponding to the viewpoint (e.g. centred on the normal of the surface position or along a notional line to the surface position) as described elsewhere herein.

Then, in a third step s1030, generating training images at the remaining viewpoints, as described herein.

It will be apparent to a person skilled in the art that one or more variations in the above method corresponding to operation of the various embodiments of the method and/or apparatus as described and claimed herein are considered within the scope of the present disclosure, including but not limited to that:

- the response of the surface of the scene to light at the surface position is dependent upon one or more selected from the list consisting of a material property associated with the position; and a variability of pixel values for pixels corresponding to the surface position in images at a plurality of candidate viewpoints, as described elsewhere herein;
- the response of the surface of the scene to light at the surface position relates to its degree of reflectivity, as described elsewhere herein;
- the method comprises the steps of generating a plurality of initial images at a plurality of positions around the scene; identifying a plurality of surface positions of the scene that are rendered within the initial images; and generating respective ones of the plurality of candidate viewpoints at a point along a normal of a respective one of the plurality of surface positions, as described elsewhere herein;
- alternatively or in addition, the method comprises the steps of generating a plurality of initial images at a plurality of positions around the scene; identifying a plurality of surface positions within the scene that are rendered within the initial images; and generating respective ones of the plurality of candidate viewpoints at a point along a notional line between a respective pixel of a respective initial image and the surface position that pixel represents, as described elsewhere herein;
  - in this case, optionally adjusting the probability of culling a candidate viewpoint responsive to how many candidate viewpoints correspond to the same surface position in the scene, as described elsewhere herein;
- the training images are rendered with a wider angle view than images of the scene would be rendered for display, as described elsewhere herein;
- a machine learning system is trained on training images as they are produced, with training image production and machine learning system training occurring in parallel (whether on the same system as parallel processes, or on separate systems running concurrently), as described elsewhere herein;
  - in this case, optionally a respective one of the remaining viewpoints is selected at random for generating a next training image, as described elsewhere herein; and
- those parts of a respective training image are rendered that correspond to surface positions in the scene that have been rendered less than a predetermined number of times in other training images, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Referring to FIG. 1, the methods and techniques described herein may be implemented on conventional hardware such as an entertainment system 10 that generates images from virtual scenes. An example of such an entertainment system 10 is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

Accordingly, in a summary embodiment of the present description, an entertainment device (such as a Sony® Playstation 5®, a corresponding development kit, or similar computer or server), comprises the following.

Firstly, a graphics processing unit (such as GPU 30, optionally in conjunction with CPU 20) configured (for example by suitable software instruction) to render a pixel at a viewpoint within an image of a virtual scene comprising a first element having a predetermined surface at a position within that scene, as described elsewhere herein.

Secondly, a machine learning processor (such as GPU 30, optionally in conjunction with CPU 20) configured (for example by suitable software instruction) to provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position, as described elsewhere herein.

The graphics processing unit is configured (again for example by suitable software instruction) to combine the predicted factor from the machine learning system with the distribution function to generate the pixel value corresponding to the illuminated first element of the virtual scene at the position, as described elsewhere herein.

Further, the graphics processing unit is also configured (again for example by suitable software instruction) to incorporate the pixel value into a rendered image for display, as described elsewhere herein.

It will be appreciated that the above hardware may similarly be configured to carry out the methods and techniques described herein, such as that:

the machine learning system was previously trained with a training set generated according to the methods as described elsewhere herein;

the entertainment device comprises a plurality of machine learning processors (e.g. respective processors, theads and/or shaders of a GPU and/or CPU) running respective machine learning systems each trained for one of a plurality of contributing components of the image (e.g. diffuse, specular, coat, etc), where a respective distribution function is used for each of the plurality of contributing components of the image, and the graphics processing unit is configured (again for example by suitable software instruction) to combine the respective generated pixel values to create the pixel value incorporated into the rendered image for display, as described elsewhere herein; and the or each machine learning system is a neural network, where an input to a first portion of the neural network comprises the position, and an input the a second portion of the neural network comprises the output of the first portion and the direction.

Similarly, in another summary embodiment of the present invention, a system for generating a training set for a neural precomputed light model (such as a Sony® Playstation 5®, a corresponding development kit, or similar computer or server), comprises the following.

Firstly, a viewpoint processing unit (such as GPU 30, and/or CPU 20) configured (for example by suitable software instruction) to generate a plurality of candidate viewpoints of a scene, as described elsewhere herein.

Secondly, a culling processing unit (such as GPU 30, and/or CPU 20) configured (for example by suitable software instruction) to cull candidate viewpoints according to a probability that depends upon a response of the surface of the scene to light at a surface position in the scene corresponding to the viewpoint, as described elsewhere herein.

And thirdly, a graphics processing unit (such as GPU 30, optionally in conjunction with CPU 20) configured (for example by suitable software instruction) to generate training images at the remaining viewpoints.

It will be appreciated that again the above hardware may similarly be configured to carry out the methods and techniques described herein, such as that:

the method comprises the steps of generating a plurality of initial images at a plurality of positions around the scene; identifying a plurality of surface positions of the scene that are rendered within the initial images; and generating respective ones of the plurality of candidate viewpoints at a point along a normal of a respective one of the plurality of surface positions, as described elsewhere herein; and alternatively or in addition, the method comprises the steps of generating a plurality of initial images at a plurality of positions around the scene; identifying a plurality of surface positions within the scene that are rendered within the initial images; and generating respective ones of the plurality of candidate viewpoints at a point along a notional line between a respective pixel of a respective initial image and the surface position that pixel represents, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating a training set for a neural precomputed light model, comprising the steps of:
   generating a plurality of candidate viewpoints of a scene;
   culling candidate viewpoints according to a probability that depends upon a response of a surface of the scene to light at a surface position in the scene offset from that surface position along a surface normal, and corresponding to, the viewpoint; and
   generating training images at the remaining viewpoints.

2. The method according to claim 1 in which the response of the surface of the scene to light at the surface position is dependent upon one or more of:
   i. a material property associated with the position; and
   ii. a variability of pixel values for pixels corresponding to the surface position in images at a plurality of candidate viewpoints.

3. The method according to claim 1 in which the response of the surface of the scene to light at the surface position relates to its degree of reflectivity.

4. The method according to claim 1, comprising the steps of:
   generating a plurality of initial images at a plurality of positions around the scene;
   identifying a plurality of surface positions of the scene that are rendered within the initial images; and
   generating respective ones of the plurality of candidate viewpoints at a point along a normal of a respective one of the plurality of surface positions.

5. The method according to claim 1, comprising the steps of:
   generating a plurality of initial images at a plurality of positions around the scene;
   identifying a plurality of surface positions within the scene that are rendered within the initial images; and
   generating respective ones of the plurality of candidate viewpoints at a point along a notional line between a respective pixel of a respective initial image and the surface position that pixel represents.

6. The method according to claim 5, comprising the step of adjusting the probability of culling a candidate viewpoint responsive to how many candidate viewpoints correspond to the same surface position in the scene.

7. The method according to claim 1, in which the training images are rendered with a wider angle view than images of the scene would be rendered for display.

8. The method according to claim 1, in which a machine learning system is trained on training images as they are produced, with training image production and machine learning system training occurring in parallel.

9. The method according to claim 8, in which a respective one of the remaining viewpoints is selected at random for generating a next training image.

10. The method according to claim 1, in which those parts of a respective training image are rendered that correspond to surface positions in the scene that have been rendered less than a predetermined number of times in other training images.

11. A non-transitory, computer readable storage medium containing a computer program comprising computer executable instructions, which when executed by a computer system, causes the computer system to perform a method of generating a training set for a neural precomputed light model by carrying out actions, comprising:
   generating a plurality of candidate viewpoints of a scene;
   culling candidate viewpoints according to a probability that depends upon a response of a surface of the scene to light at a surface position in the scene offset from that surface position along a surface normal, and corresponding to, the viewpoint; and
   generating training images at the remaining viewpoints.

12. An image rendering method for rendering a pixel at a viewpoint, comprising the steps of:
   for a first element of a virtual scene, having a predetermined surface at a position within that scene,
   providing the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;
   combining the predicted factor from the machine learning system with the distribution function to generate the pixel value corresponding to the illuminated first element of the virtual scene at the position; and
   incorporating the pixel value into a rendered image for display;
   wherein the machine learning system was previously trained with a training set generated according to a method of generating the training set for a neural precomputed light model, comprising the steps of:
   generating a plurality of candidate viewpoints of a scene;
   culling candidate viewpoints according to a probability that depends upon a response of the surface of the scene to light at a surface position in the scene corresponding to the view point; and
   generating training images at the remaining viewpoints.

13. A non-transitory, computer readable storage medium containing a computer program comprising computer executable instructions, which when executed by a computer system, causes the computer system to perform an image rendering method for rendering a pixel at a viewpoint by carrying out actions, comprising:
   for a first element of a virtual scene, having a predetermined surface at a position within that scene,
   providing the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;
   combining the predicted factor from the machine learning system with the distribution function to generate the pixel value corresponding to the illuminated first element of the virtual scene at the position; and
   incorporating the pixel value into a rendered image for display;
   wherein the machine learning system was previously trained with a training set generated according to a method of generating the training set for a neural precomputed light model, comprising the steps of:
   generating a plurality of candidate viewpoints of a scene;
   culling candidate viewpoints according to a probability that depends upon a response of the surface of the scene to light at a surface position in the scene corresponding to the viewpoint; and
   generating training images at the remaining viewpoints.

14. A system for generating a training set for a neural precomputed light model, comprising:
   a viewpoint processing unit configured to generate a plurality of candidate viewpoints of a scene;
   a culling processing unit configured to cull candidate viewpoints according to a probability that depends upon a response of a surface of the scene to light at a surface position in the scene offset from that surface position along a surface normal, and corresponding to, the viewpoint; and
   a graphics processing unit configured to generate training images at the remaining viewpoints.

15. A system for rendering a pixel at a viewpoint, comprising:
   a graphics processing unit configured to render a pixel at a viewpoint within an image of a virtual scene comprising a first element having a predetermined surface at a position within that scene;
   a machine learning processor configured to provide the position and a direction based on the viewpoint to a machine learning system previously trained to predict a factor that, when combined with a distribution function that characterises an interaction of light with the predetermined surface, generates a pixel value corresponding to the first element of the virtual scene as illuminated at the position;
   the graphics processing unit being configured to combine the predicted factor from the machine learning system with the distribution function to generate the pixel value corresponding to the illuminated first element of the virtual scene at the position; and
   the graphics processing unit being configured to incorporate the pixel value into a rendered image for display;
   wherein the machine learning system was previously trained with a training set generated by a system for generating the training set for a neural precomputed light model, comprising:
   a viewpoint processing unit configured to generate a plurality of candidate viewpoints of a scene;
   a culling processing unit configured to cull candidate viewpoints according to a probability that depends upon a response of the surface of the scene to light at a surface position in the scene corresponding to the viewpoint; and
   a graphics processing unit configured to generate training images at the remaining viewpoints.

16. The system of claim 15, comprising:
   a plurality of machine learning processors running respective machine learning systems each trained for one of a plurality of contributing components of the image, where a respective distribution function is used for each of the plurality of contributing components of the image; and the graphics processing unit is configured to combine the respective generated pixel values to create a final combined pixel value pixel value incorporated into the rendered image for display.

* * * * *